United States Patent
Tate, Jr. et al.

(10) Patent No.: US 8,775,050 B2
(45) Date of Patent: Jul. 8, 2014

(54) METHOD TO TRIGGER ENGINE START OF A HYBRID VEHICLE BASED ON LOCAL TRAFFIC CONDITIONS

(75) Inventors: Edward D. Tate, Jr., Grand Blanc, MI (US); Alan G. Holmes, Clarkston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 155 days.

(21) Appl. No.: 13/408,148

(22) Filed: Feb. 29, 2012

(65) Prior Publication Data

US 2013/0226378 A1    Aug. 29, 2013

(51) Int. Cl.
G06F 19/00    (2011.01)
B60W 10/06    (2006.01)
F02D 41/00    (2006.01)
F02D 41/30    (2006.01)

(52) U.S. Cl.
CPC ............ B60W 10/06 (2013.01); F02D 41/009 (2013.01); F02D 41/30 (2013.01)
USPC ........................................... 701/101; 701/22

(58) Field of Classification Search
CPC ............... B60W 30/18018; B60W 30/18054; B60W 10/06; F02D 41/30; F02D 41/009
USPC ............... 701/22, 300–302, 101; 903/914; 180/65.28
See application file for complete search history.

(56) References Cited

U.S. PATENT DOCUMENTS

| | | | |
|---|---|---|---|
| 6,532,926 B1* | 3/2003 | Kuroda et al. | 123/179.4 |
| 7,032,393 B2* | 4/2006 | Tamai et al. | 62/115 |
| 8,428,845 B2* | 4/2013 | Miyazaki et al. | 701/101 |
| 2011/0071746 A1* | 3/2011 | O'Connor et al. | 701/101 |
| 2013/0191005 A1* | 7/2013 | Hrovat et al. | 701/102 |

* cited by examiner

*Primary Examiner* — Helal A Algahaim
*Assistant Examiner* — Nga X Nguyen
(74) *Attorney, Agent, or Firm* — Quinn Law Group, PLLC

(57) ABSTRACT

A method of operating a hybrid vehicle includes disengaging, i.e., turning off, an internal combustion engine when a brake pedal is disposed in a released position, i.e., non-depressed position, an accelerator pedal is disposed in a released position, i.e., non-depressed position, and a forward path of the hybrid vehicle is blocked, thereby conserving fuel. The method includes engaging, i.e., starting, the internal combustion engine when the brake pedal is disposed in the released position, the accelerator pedal is disposed in the released position, and the forward path of the hybrid vehicle is clear, thereby allowing for a quick launch of the vehicle.

16 Claims, 3 Drawing Sheets

| 52 | 54 | 56 | 58 | 60 | 62 | 64 |
|----|----|----|----|----|----|----|
| R | D | D | C | X | - | X |
| R | D | D | B | - | - | X |
| R | D | R | C | - | - | O |
| R | D | R | B | - | O | X |
| R | R | D | C | X | - | X |
| R | - | D | C | L | - | O |
| R | R | D | B | - | - | X |
| R | R | R | C | - | - | O |
| R | R | R | B | - | O | X |
| R | - | R | B | - | X | O |
| D | R | R | C | - | - | O |

FIG. 3

METHOD TO TRIGGER ENGINE START OF A HYBRID VEHICLE BASED ON LOCAL TRAFFIC CONDITIONS

TECHNICAL FIELD

The invention is generally related to a hybrid vehicle, and more specifically to a method of controlling an internal combustion engine of the hybrid vehicle.

BACKGROUND

Hybrid electric vehicles having an internal combustion engine selectively operable to provide power to the vehicle may disengage, i.e., turn off, the internal combustion engine when the hybrid vehicle is stopped, such as when at a traffic light, and a brake pedal is depressed to apply a braking system of the vehicle. The internal combustion engine will remain disengaged, i.e., turned off, so long as a brake pedal of the vehicle is depressed. Upon the brake pedal being released, the hybrid vehicle engages, i.e., starts, the internal combustion engine. However, if the hybrid vehicle is equipped with a manual transmission, an operator of the hybrid vehicle may remain stopped with the manual transmission out of gear and the brake pedal released, thereby causing the vehicle to engage, i.e., run, the internal combustion engine, which decreases the overall fuel efficiency of the hybrid vehicle.

SUMMARY

A method of operating a hybrid vehicle is provided. The method includes sensing a position of an accelerator pedal of the hybrid vehicle to determine if the accelerator pedal is disposed in a released position or in a depressed position, sensing a position of a brake pedal of the hybrid vehicle to determine if the brake pedal is disposed in a released position or in a depressed position, and scanning a forward path of the hybrid vehicle to determine if the forward path is clear or is blocked. When the accelerator pedal is disposed in the released position, the brake pedal is disposed in the released position, and the forward path of the hybrid vehicle is blocked, an internal combustion engine of the hybrid vehicle is disengaged.

A hybrid vehicle is also provided. The hybrid vehicle includes an internal combustion engine, and an accelerator pedal coupled to the internal combustion engine. The accelerator pedal is moveable between a released position and a depressed position to control a fuel injection rate of the internal combustion engine. An accelerator position sensor is configured for sensing the position of the accelerator pedal. A brake pedal is moveable between a released position and a depressed position for applying a braking force. A brake position sensor is configured for sensing the position of the brake pedal. A forward path sensor is configured for sensing an object disposed along a forward path. A control module is in communication with the accelerator position sensor, the brake position sensor, and the forward path sensor for receiving information related to the position of the accelerator pedal, the position of the brake pedal, and the presence of an object along the forward path. The control module is in communication with the internal combustion engine for controlling the engagement and the disengagement of the internal combustion engine. The control module includes an algorithm operable therein for determining if the accelerator pedal is disposed in the released position or the depressed position based upon the information received from the accelerator position sensor, determining if the brake pedal is disposed in the released position or the depressed position based upon the information received from the brake position sensor, and determining if a forward path is clear or is blocked based upon the information received from the forward path sensor. The control module disengages the internal combustion engine when the accelerator pedal is determined to be disposed in the released position, the brake pedal is determined to be disposed in the released position, and the forward path is determined to be blocked.

Accordingly, when the hybrid vehicle is stopped, such as at a stop light, and the forward path of the hybrid vehicle is blocked, such as by another vehicle in front of the hybrid vehicle, the control module disengages the internal combustion engine to conserve fuel, even when the brake pedal is disposed in the released position such as may occur if the vehicle is equipped with a manual transmission. When the brake pedal is disposed in the released position, and as soon as the object blocking the forward path of the vehicle moves, thereby clearing the forward path of the vehicle, the control module engages, i.e., starts, the internal combustion engine to allow for a quick vehicle launch as soon as the accelerator pedal is depressed.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a chart showing an operating strategy of the hybrid vehicle.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
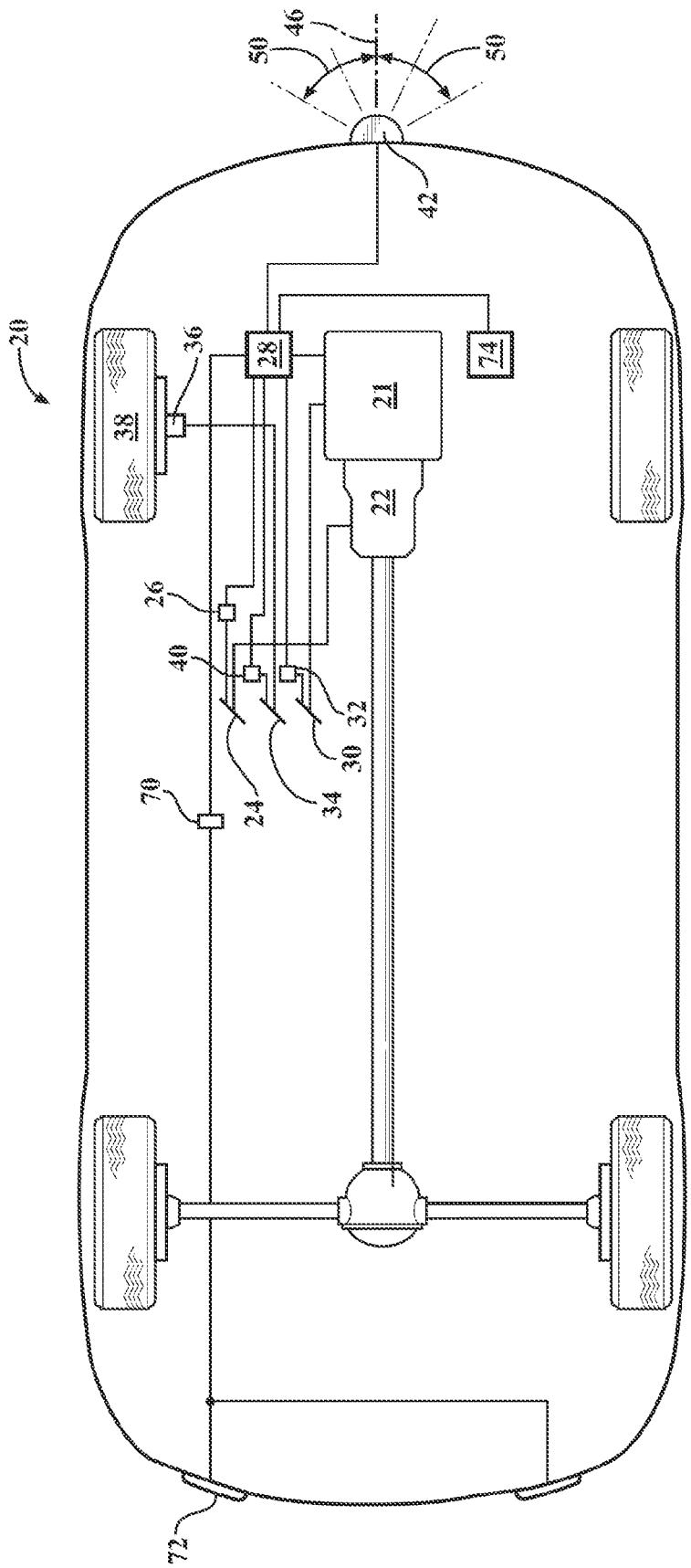
FIG. 1 is a schematic plan view showing a hybrid vehicle

Referring to the Figures, wherein like numerals indicate like parts throughout the several views, a vehicle is generally shown at 20. Referring to FIG. 1, the vehicle 20 may include any suitable style and/or configuration that utilizes an internal combustion engine 21 to generate a drive torque. The internal combustion engine 21 may include but is not limited to a gasoline engine or a diesel engine. The vehicle 20 may include a hybrid vehicle 20 further including an electric motor (not shown) used either separately from or in combination with the internal combustion engine 21, to power the vehicle 20. The specific interaction between the internal combustion engine 21 and the electric motor are not pertinent to the invention, and is therefore not described in detail herein.

A transmission 22 is coupled to the internal combustion engine 21. The transmission 22 directs a torque output from the internal combustion engine 21 through a plurality of different gear ratios to convert the speed/torque ratio of the torque output to maintain the operation of the internal combustion engine 21 within a desired range for a given speed of the vehicle 20. The transmission 22 may include either an automatic transmission or a manual transmission 22, such as shown in FIG. 1. However, the method of operating the vehicle 20 described herein is particularly well suited for use with a vehicle 20 having the manual transmission 22. The manual transmission 22 includes a clutch pedal 24 that is moveable between a released position and a depressed position. When disposed in the released position, the clutch pedal 24 allows direct torque communication between the internal combustion engine 21 and the manual transmission 22. When disposed in the depressed position, the clutch pedal 24 interrupts torque transmission between the internal combustion engine 21 and the transmission 22, thereby allowing an operator to manually change gear ratios within the transmission 22.

The vehicle 20 includes a clutch sensor 26 that is configured for sensing the position of the clutch pedal 24. More specifically, the clutch sensor 26 is configured for sensing whether the clutch pedal 24 is disposed in the released position or in the depressed position. The clutch sensor 26 may include any style, type and/or configuration of sensor or software capable of determining the position of the clutch pedal 24, and communicating information relating to the position of the clutch pedal 24 to a control module 28.

An accelerator pedal 30 is coupled to the internal combustion engine 21. The accelerator pedal 30 is moveable between a released position and a depressed position to control a fuel injection rate of the internal combustion engine 21. When disposed in the released position, fuel is injected into the internal combustion engine 21 at a minimum or idle fuel injection rate. In general, the fuel injection rate increases as the accelerator pedal 30 is depressed. Accordingly, the depressed position of the accelerator pedal 30 may be defined as a continuously variable position that is different from the released position of the accelerator pedal 30. As is known, an increase in the fuel injection rate is associated with an increased torque output from the internal combustion engine 21, and is often associated with a desired acceleration of the vehicle 20.

The vehicle 20 includes an accelerator position sensor 32 that is configured for sensing the position of the accelerator pedal 30. More specifically, the accelerator position sensor 32 is configured for sensing whether the accelerator pedal 30 is disposed in the released position or in the depressed position. The accelerator position sensor 32 may include any style, type and/or configuration of sensor or software capable of determining the position of the accelerator pedal 30, and communicating information relating to the position of the accelerator pedal 30 to the control module 28.

A brake pedal 34 is coupled to a brake system 36 of the vehicle 20. The brake system 36 applies a braking force to one or more of the wheels 38 of the vehicle 20 to slow and/or resist movement of the vehicle 20. The brake pedal 34 is moveable between a released position and a depressed position. When disposed in the released position, the brake pedal 34 does not actuate the brake system 36 and no braking force is applied. When disposed in the depressed position, the brake pedal 34 actuates the brake system 36 to apply the braking force. The braking force increases as the brake pedal 34 is depressed. Accordingly, the depressed position of the brake pedal 34 may be defined as a continuously variable position that is different from the released position of the brake pedal 34.

The vehicle 20 includes brake position sensor 40 that is configured for sensing the position of the brake pedal 34. More specifically, the brake position sensor 40 is configured for sensing whether the brake pedal 34 is disposed in the released position or in the depressed position. The brake position sensor 40 may include any style, type and/or configuration of sensor or software capable of determining the position of the brake pedal 34, and communicating information relating to the position of the brake pedal 34 to the control module 28.

Figure 2:
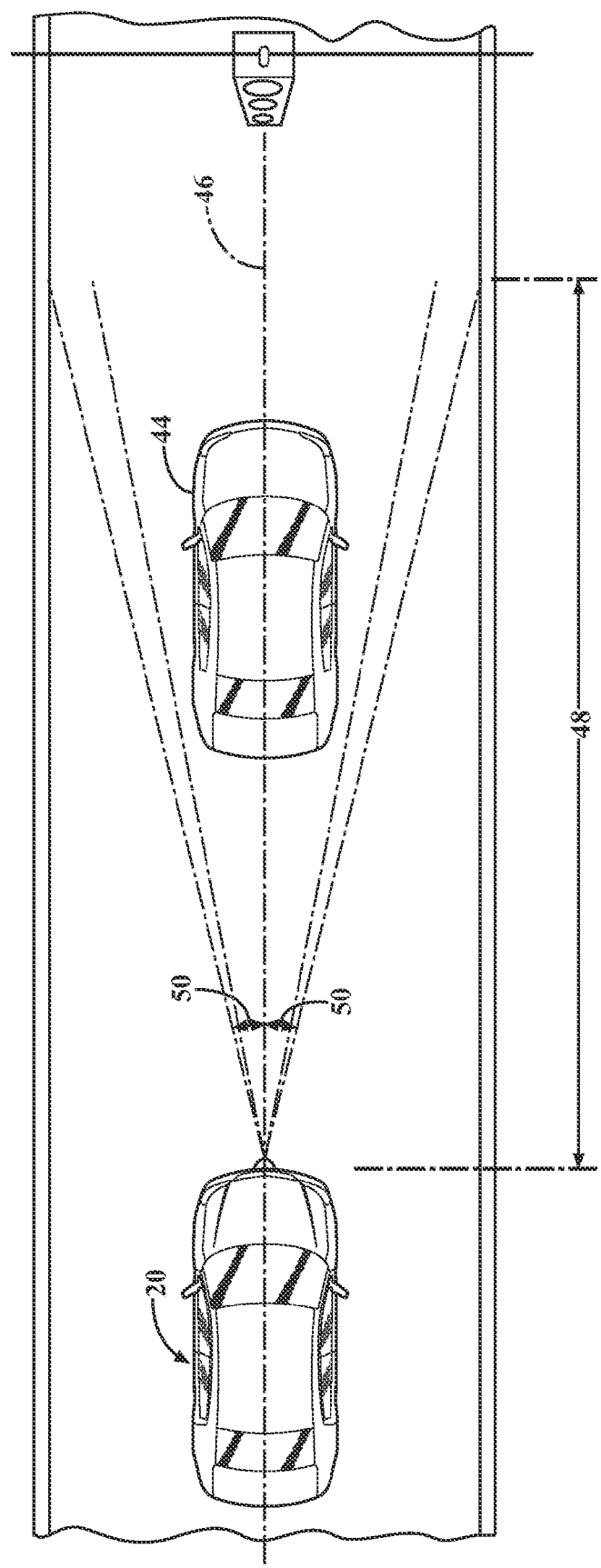
FIG. 2 is a schematic plan view showing the hybrid vehicle stopped behind a lead vehicle.

The vehicle 20 further includes a forward path sensor 42, shown in FIG. 1. Referring also to FIG. 2, the forward path sensor 42 is configured for sensing an object 44 disposed along a forward path 46 of the vehicle 20. The forward path sensor 42 may include but is not limited to one or more of a sonar sensor, a radar sensor, an optical sensor, a lidar sensor, or some other sensor capable of scanning ahead of the vehicle 20 to detect objects 44 disposed in the forward path 46 of the vehicle 20, and communicating information related to any objects 44 detected along the forward path 46 of the vehicle 20 to the control module 28. Preferably, the forward path sensor 42 scans ahead of the vehicle 20 for a pre-defined distance 48 of between the range of 0 ft and 25 ft, and fans out at an angle 50 of between the range of −30° and 30° on either side of the forward path 46 of the vehicle 20. The forward path sensor 42 may be optimized to detect and or identify other vehicle 20s disposed along the forward path 46 of the vehicle 20 that may be positioned within the pre-defined distance 48 of the vehicle 20.

The control module 28 is in communication with the accelerator position sensor 32, the brake position sensor 40, the clutch position sensor and the forward path sensor 42 for receiving information related to the position of the accelerator pedal 30, the position of the brake pedal 34, the position of the clutch pedal 24, and the presence of an object 44, e.g., a vehicle 20, disposed along the forward path 46 of the vehicle 20. The control module 28 is also in communication with the internal combustion engine 21 and configured for controlling the operation of the internal combustion engine 21. More specifically, the control module 28 is configured for controlling the engagement of the internal combustion engine 21, i.e., controlling when the internal combustion engine 21 is turned on and running, and the disengagement of the internal combustion engine 21, i.e., controlling when the internal combustion engine 21 is turned off and not running. The control module 28 controls the engagement and disengagement of the internal combustion engine 21 based on the information received from the various sensors regarding the position of the accelerator pedal 30, the position of the brake pedal 34, the position of the clutch pedal 24 and the presence of an object 44 along the forward path 46 of the vehicle 20.

The control module 28 may include all hardware, software, memory, communication links, etc, necessary to receive information from the various sensors and control the operation of the internal combustion engine 21. Specifically, the control module 28 includes an algorithm operable to implement a method to control when the internal combustion engine 21 of the vehicle 20 is running or is not running when the vehicle 20 is stopped. As is known, under certain conditions, the control module 28 may disengage, i.e., turn off, the internal combustion engine 21 when the vehicle 20 is stopped to conserve fuel.

Referring to FIG. 3, a strategy for controlling the internal combustion engine 21 is shown. Within FIG. 3, the position of the acceleration pedal is indicated in column 52, wherein an "R" indicates the acceleration pedal is disposed in the released position, and a "D" indicates the acceleration pedal is disposed in the depressed position; the position of the clutch pedal 24 is indicated in column 54, wherein an "R" indicates the clutch pedal 24 is disposed in the released position, and a "D" indicates the clutch pedal 24 is disposed in the depressed position; the position of the brake pedal 34 is indicated in column 56, wherein an "R" indicates the brake pedal 34 is disposed in the released position, and a "D" indicates the brake pedal 34 is disposed in the depressed position; the condition of the forward path 46 of the vehicle 20 is indicated in column 58, wherein a "B" indicates that the forward path 46 of the vehicle 20 is blocked, and a "C" indicates that the forward path 46 of the vehicle 20 is clear; an intended left hand turn of the vehicle 20 is indicated at column 60, wherein an "L" indicates an intended left turn of the vehicle 20, and an "X" indicates no left turn of the vehicle 20 is intended; a location of the vehicle 20 is indicated at column 62, wherein an "O" indicates the vehicle 20 is located on a roadway, and an "X" indicates that the vehicle 20 is located off of a roadway; and the status of the internal combustion engine 21 is indicated in column 64, wherein an "O" indicates that the internal combustion engine 21 is engaged, i.e., turned on and running, and an "X" indicates that the internal combustion engine 21 is disengaged, i.e., turned off and not running. A dash "–" in any field indicates that no specific operating condition is required and/or considered. The different rows of FIG. 3 represent the different operating conditions of the vehicle and the resultant operating strategy for the internal combustion engine under the given parameters.

The method of controlling the operation of the internal combustion engine 21 of the vehicle 20 includes sensing the position of the accelerator pedal 30 of the vehicle 20 to determine if the accelerator pedal 30 is disposed in the released position or in the depressed position. The control module 28 determines if the accelerator pedal 30 is disposed in the released position or the depressed position based upon the information received from the accelerator position sensor 32. If the accelerator pedal 30 is disposed in the depressed position, then the control module 28 allows the internal combustion engine 21 to continue operating or running. If the accelerator pedal 30 is disposed in the released position, then the control module 28 must determine whether to operate the internal combustion engine 21, i.e., keep the internal combustion engine 21 running, or to disengage the internal combustion engine 21, i.e., turn the internal combustion engine 21 off.

If the accelerator pedal 30 is disposed in the released position, then the position of the brake pedal 34 is sensed to determine if the brake pedal 34 is disposed in the released position or in the depressed position. The control module 28 determines if the brake pedal 34 is disposed in the released position or the depressed position based upon the information received from the brake position sensor 40. If the brake pedal 34 is disposed in the depressed position, thereby indicated that the brake system 36 is being applied to restrain the vehicle 20 and the vehicle 20 is not in a condition to accelerate, then the control module 28 may disengage the internal combustion engine 21 to conserve fuel. However, if the brake pedal 34 is disposed in the released position, thereby indicated that the brake system 36 is not engaged and the vehicle 20 is free to accelerate, then the control module 28 may engage the internal combustion engine 21.

The forward path 46 of the vehicle 20 is scanned to determine if the forward path 46 is clear or is blocked by an object 44, such as another vehicle 20. The control module 28 determines if the forward path 46 is clear or is blocked based upon the information received from the forward path sensor 42. As noted above, the forward path sensor 42 is configured to sense the presence of an object 44 along or within the forward path 46 of the vehicle 20 and within the pre-defined distance 48 in front of the vehicle 20. When no objects 44 are sensed within the pre-defined distance 48 along the forward path 46 of the vehicle 20, then the control module 28 determines that the forward path 46 of the vehicle 20 is clear. If the forward path 46 of the vehicle 20 is clear, and both the accelerator pedal 30 and the brake pedal 34 are disposed in the released position, then the control module 28 may determine that the operator may intend a quick acceleration and/or launch, and engage the internal combustion engine 21 in preparation therefore.

If an object 44 is sensed along the forward path 46 and within the pre-defined distance 48 in front of the vehicle 20, then the control module 28 may calculate a rate of acceleration of the object 44 away from the vehicle 20. The rate of acceleration is the increase in speed at which the object 44 is pulling ahead of the vehicle 20. The rate of acceleration is calculated based upon the information received by the control module 28 from the forward path sensor 42. If the rate of acceleration is negative, i.e., accelerating toward the vehicle 20 and getting closer to the vehicle 20, or is positive but below a pre-defined limit, i.e., is accelerating away from the vehicle 20 slowly, then the control module 28 may determine that the vehicle 20 is blocked from moving forward and may disengage the internal combustion engine 21 to conserve fuel.

Accordingly, when the accelerator pedal 30 is disposed in the released position and the forward path 46 of the vehicle 20 is blocked, the control module 28 may disengage the internal combustion engine 21 of the vehicle 20 even though the brake pedal 34 is disposed in the released position indicating that the operator may wish to accelerate. The control module 28 may disengage the internal combustion engine 21 based upon determining that the forward path 46 of the vehicle 20 is blocked, and the operator does not require and/or is unable to execute a quick acceleration or launch of the vehicle 20. This method may be applied to a vehicle 20 having an automatic transmission or a manual transmission 22. In vehicle 20s having an automatic transmission, operators tend to continuously apply the brake pedal 34 whenever stopped to restrain the constant output torque of the internal combustion engine 21 when the internal combustion engine 21 is operating. However, as noted above, this method is particularly relevant to a vehicle 20 having a manual transmission 22 due to the inclination of some operators to sit with the vehicle 20 stopped and the transmission 22 in neutral or with the clutch pedal 24 depressed, thereby disconnecting the torque output of the internal combustion engine 21 from the transmission 22, with both feet off the brake pedal 34 and the accelerator pedal 30, i.e., with both the brake pedal 34 and the accelerator pedal 30 disposed in their respective released positions.

The method may further include sensing the position of the clutch pedal 24 of the manual transmission 22 to determine if the clutch pedal 24 is disposed in the released position or in the depressed position. The control module 28 determines if the clutch pedal 24 is disposed in the released position or the depressed position based upon the information received from the clutch sensor 26. The control module 28 may determine that if the clutch pedal 24 is disposed in the depressed position, with both the accelerator pedal 30 and the brake pedal 34 disposed in their respective released positions, that the operator intends to make a quick acceleration or launch, in which case the control module 28 may engage the internal combustion engine 21 in preparation for such a quick acceleration or launch, if the forward path 46 of the vehicle 20 is clear. However, if the forward path 46 of the vehicle 20 is blocked, then the control module 28 may disengage the internal combustion engine 21, even though the clutch pedal 24 is disposed in the depressed position and the brake pedal 34 and the accelerator pedal 30 are both disposed in their respective released positions. Alternatively, the control module 28 may still determine to engage the internal combustion engine 21 when the forward path 46 ahead of the vehicle 20 is clear and the brake pedal 34 is disposed in the released position, even when the clutch pedal 24 is also disposed in the released position.

The method may further include sensing if a left turn of the vehicle 20 is currently being indicated. For example, a left turn of the vehicle 20 may be indicated by sensing a position of a turn signal switch 70 (shown in FIG. 1) to determine if the turn signal switch 70 is disposed in a left turn position, a neutral position, or a right turn position. If the turn signal switch 70 is disposed in the left turn position, then the control module 28 may determine that a left turn of the vehicle 20 is indicated. Alternatively, a sensor may sense when a left turn indicator light 72 (shown in FIG. 1) is flashing, thereby also indicating a left turn of the vehicle 20. It should be appreciated that the control module 28 may determine if a left turn of the vehicle 20 is indicated in some other manner not described herein. If the control module 28 determines that a left turn of the vehicle 20 is indicated, and the forward path 46 of the vehicle 20 is clear, then the control module 28 may engage the internal combustion engine 21 in preparation for a quick acceleration or launch, even though the brake pedal 34 is disposed in the depressed position.

The method may further include sensing a location of the vehicle 20 to determine if the vehicle 20 is located on a roadway or located off of a roadway. The location of the vehicle 20 may be sensed and/or determined, for example, with a Global Positioning Satellite (GPS) device 74 (shown in FIG. 1). The GPS device 74 may communicate the information related to the location of the vehicle 20 to the control module 28 so that the control module 28 may determine if the vehicle 20 is located on a roadway or off a roadway. The control module 28 or the GPS device 74 may make this determination, for example, by comparing the location of the vehicle 20 to maps stored in memory. If the control module 28 determines that the vehicle 20 is located off of a roadway, then the control module 28 may determine to engage the internal combustion engine 21, even though the accelerator pedal 30 is disposed in the released position, the brake pedal 34 is disposed in the released position and the forward path 46 of the vehicle 20 is blocked. Alternatively, if the control module 28 determines that the vehicle 20 is located on a roadway, then as described above, the control module 28 may determine to disengage the internal combustion engine 21 when the accelerator pedal 30 is disposed in the released position, the brake pedal 34 is disposed in the released position and the forward path 46 of the vehicle 20 is blocked.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of operating a hybrid vehicle, the method comprising:
   Sensing a position of an accelerator pedal of the hybrid vehicle to determine if the accelerator pedal is disposed in a released position or in a depressed position;
   Sensing a position of a brake pedal of the hybrid vehicle to determine if the brake pedal is disposed in a released position or in a depressed position;
   Scanning a forward path of the hybrid vehicle to determine if the forward path is clear or is blocked;
   Disengaging, by a controller, an internal combustion engine of the hybrid vehicle when the accelerator pedal is disposed in the released position, the brake pedal is disposed in the released position, and the forward path of the hybrid vehicle is blocked;
   Sensing if a left turn of the hybrid vehicle is currently being indicated
   Engaging, by the controller, the internal combustion engine of the hybrid vehicle when the accelerator pedal is disposed in the released position, the brake pedal is disposed in the depressed position, the forward path of the hybrid vehicle is clear, and a left turn of the hybrid vehicle is indicated.

2. A method as set forth in claim 1 further comprising engaging the internal combustion engine of the hybrid vehicle when the accelerator pedal is disposed in the released position, the brake pedal is disposed in the released position, and the forward path of the hybrid vehicle is clear.

3. A method as set forth in claim 1 wherein sensing if a left turn of the hybrid vehicle is currently being indicated includes sensing a position of a turn signal switch to determine if the turn signal switch is disposed in a left turn position, a neutral position, or a right turn position.

4. A method as set forth in claim 1 wherein the hybrid vehicle includes a manual transmission, and wherein the method further comprises sensing a position of a clutch pedal of the manual transmission to determine if the clutch pedal is disposed in a released position or in a depressed position.

5. A method as set forth in claim 4 further comprising engaging the internal combustion engine of the hybrid vehicle when the accelerator pedal is disposed in the released position, the brake pedal is disposed in the released position, the forward path of the hybrid vehicle is clear, and the clutch pedal is disposed in the released position.

6. A method as set forth in claim 4 further comprising engaging the internal combustion engine of the hybrid vehicle when the accelerator pedal is disposed in the released position, the brake pedal is disposed in the released position, the forward path of the hybrid vehicle is clear, and the clutch pedal is disposed in the depressed position.

7. A method as set forth in claim 1 wherein scanning the forward path of the hybrid vehicle includes sensing the presence of an object disposed along the forward path of the hybrid vehicle with one of a sonar sensor, a radar sensor, an optical sensor, or a lidar sensor.

8. A method as set forth in claim 7 wherein sensing the presence of an object along the forward path of the hybrid vehicle is further defined as sensing the presence of an object within a pre-defined distance of the hybrid vehicle disposed along the forward path of the hybrid vehicle.

9. A method as set forth in claim 8 wherein the pre-defined distance is equal to a distance between the range of 0 ft. and 25 ft.

10. A method as set forth in claim 8 further comprising calculating a rate of acceleration away from the hybrid vehicle of an object sensed within the pre-determined distance along the forward path of the hybrid vehicle.

11. A method as set forth in claim 10 further comprising determining the forward path of the hybrid vehicle is clear when no objects are sensed within the pre-defined distance along the forward path of the hybrid vehicle.

12. A method as set forth in claim 10 further comprising determining the forward path of the hybrid vehicle is blocked when an object is sensed within the pre-defined distance along the forward path of the hybrid vehicle and the calculated rate of acceleration of the sensed object away from the hybrid vehicle is less than a pre-defined limit.

13. A method as set forth in claim 1 further comprising sensing a location of the hybrid vehicle to determine if the hybrid vehicle is located on a roadway or located off of a roadway.

14. A method as set forth in claim 13 wherein disengaging the internal combustion engine of the hybrid vehicle is further defined as disengaging the internal combustion engine of the hybrid vehicle when the accelerator pedal is disposed in the released position, the brake pedal is disposed in the released position the forward path of the hybrid vehicle is blocked, and the vehicle is disposed on a roadway.

15. A method as set forth in claim 13 further comprising engaging the internal combustion engine of the hybrid vehicle when the accelerator pedal is disposed in the released position, the brake pedal is disposed in the released position the forward path of the hybrid vehicle is blocked, and the vehicle is disposed off of a roadway.

16. A method as set forth in claim 1 further comprising a control module in communication with a plurality of sensors for sensing a position of the accelerator pedal, a position of the brake pedal and a presence of an object along the forward path of the hybrid vehicle, and configured for controlling the operation of the internal combustion engine based upon the information from the sensors regarding the position of the accelerator pedal, the position of the brake pedal, and the presence of an object along the forward path of the hybrid vehicle.

* * * * *